United States Patent [19]
Min et al.

[11] Patent Number: 5,955,168
[45] Date of Patent: Sep. 21, 1999

[54] OPTICAL RECORDING MEDIUM

[75] Inventors: Kyung-sun Min, Yongin; Sung-hoon Kim, Seoul; Young-jae Huh, Sungnam; Soo-hyung Lee, Yongin, all of Rep. of Korea

[73] Assignee: Samsung Electronics Co., Ltd., Suwon, Rep. of Korea

[21] Appl. No.: 08/908,570

[22] Filed: Aug. 8, 1997

[30] Foreign Application Priority Data

Oct. 10, 1996 [KR] Rep. of Korea ............. 96-45120
Jul. 7, 1997 [KR] Rep. of Korea ............. 97-31317

[51] Int. Cl.$^6$ ........................................... B32B 3/00
[52] U.S. Cl. .................... 428/64.1; 428/64.2; 428/64.4; 428/64.7; 428/64.8; 428/457; 428/913; 430/270.12; 430/495.1; 430/945; 369/275.4; 369/283; 369/288
[58] Field of Search ............................. 428/64.1, 64.2, 428/64.4, 64.7, 64.8, 457, 913; 430/270.12, 495.1, 945; 369/275.1, 275.4, 283, 288

[56] References Cited

U.S. PATENT DOCUMENTS

| | | |
|---|---|---|
| 4,398,203 | 8/1983 | Cornet . |
| 4,920,359 | 4/1990 | Arai et al. . |
| 4,940,618 | 7/1990 | Hamada et al. . |
| 4,973,520 | 11/1990 | Takada et al. . |
| 4,983,440 | 1/1991 | Ikeda et al. . |
| 4,990,388 | 2/1991 | Hamada et al. . |
| 5,009,818 | 4/1991 | Arai et al. . |
| 5,020,048 | 5/1991 | Arai et al. . |
| 5,039,558 | 8/1991 | Imai et al. . |
| 5,080,946 | 1/1992 | Takagisi et al. . |
| 5,090,008 | 2/1992 | Clark et al. . |
| 5,090,009 | 2/1992 | Hamada et al. . |
| 5,155,723 | 10/1992 | Hamada et al. . |
| 5,213,955 | 5/1993 | Hamada et al. . |
| 5,318,882 | 6/1994 | Ootaguro et al. . |
| 5,328,813 | 7/1994 | Strandjord et al. . |
| 5,398,231 | 3/1995 | Shin et al. . |
| 5,407,719 | 4/1995 | Hamada et al. . |
| 5,409,756 | 4/1995 | Ikeda et al. . |

FOREIGN PATENT DOCUMENTS

| | | |
|---|---|---|
| 0 130 329 A1 | 1/1985 | European Pat. Off. . |
| 0 317 696 | 5/1989 | European Pat. Off. . |
| 0 474 311 A1 | 3/1992 | European Pat. Off. . |
| 0 536 406 A | 4/1993 | European Pat. Off. . |
| 0 777 224 | 6/1997 | European Pat. Off. . |
| 63-268142 | 11/1988 | Japan . |

OTHER PUBLICATIONS

Patent Abstracts of Japan, vol. 15, No. 192 (P–1202), May 17, 1991 & UJP 03 046136 A (Toppan Printing), Feb. 27, 1991.

Patent Abstracts of Japan, vol. 14, No. 494 (P–1123), Oct. 26, 1990 & JP 02 201748 A (Matsushita), Aug. 9, 1990.

*Primary Examiner*—Elizabeth Evans
*Attorney, Agent, or Firm*—Burns, Doane, Swecker & Mathis, L.L.P.

[57] ABSTRACT

In the optical recording medium including a substrate having pregrooves, and a metal recording layer, a buffering layer, a reflecting layer and a protecting layer which are sequentially stacked on the substrate, wherein the buffering layer is formed of an organic material having a low light absorption with respect to a laser beam of 600~800 nm, such that light absorption (k) is less than or equal to 1.0 at 650 nm and the light absorption (k) is less than or equal to 0.1 at 780 nm. Therefore, the optical recording medium can be compatible with a compact disc (CD) and have a high reflectivity at longer wavelength than 600 nm.

21 Claims, 2 Drawing Sheets

OPTICAL RECORDING MEDIUM

BACKGROUND OF THE INVENTION

The present invention relates to an optical recording medium, and more particularly, to an optical recording medium which is compatible with compact discs (CD's) and has a high reflectivity at wavelengths longer than 600 nm, and in and from which information can be recorded and reproduced by a digital versatile disc player (DVDP) and a compact disc player (CDP).

The recording area per recording unit of an optical recording medium is smaller than that of a conventional magnetic recording medium, so that the optical recording medium has been used as a high density recording medium. The optical recording medium is classified into read only memory (ROM) type which only reproduces already recorded information, write once read many (WORM) type which is recordable just once and readable many times, and rewritable type which is recordable, erasable and rewritable. The information recorded in the optical recording medium should be reproduced by a player for the ROM type medium. To this end, the optical recording medium must satisfy a conventional standardization rules (RED BOOK), so that reflectivity of 65% or more and carrier-to-noise ratio (CNR) of 47 dB or more are required.

In a recordable optical recording medium, the recorded information can be reproduced based on the change of the reflectivity which is caused by a physical modification, phase change or change of a magnetic property in a recording layer before and after the recording. Also, for making the optical recording medium compatible with CD's, a long-term data storing property and a high recording density are required as well as the above high reflectivity and CNR characteristic. In order to improve the characteristic of the optical recording medium and make the manufacturing process easily, various optical recording media being formed of various materials have been suggested, and a group of them is in practical use.

As a conventional optical recording medium, Japanese Laid-open Patent Publication No. showha 63-268142 discloses a recording medium having a structure in which a sensitizing layer formed of gelatin, casein or polyvinyl alcohol (PVA), and a metal thin film as a recording layer formed of chromium (Cr), nickel (Ni) or gold (Au) are sequentially stacked on a substrate. According to the optical recording principle of the recording medium, the metal thin film absorbs heat of an irradiated laser beam, and thus the sensitizing layer and the metal thin film are deformed to form a recording pit. However, the recording pit of this recording medium is exposed so that it is difficult to store the recorded information for a long-term.

U.S. Pat. No. 4,983,440 discloses a recording medium having a structure in which two metal thin films as a recording layer, and a protecting layer for protecting the recording layer are sequentially stacked on a substrate. However, this recording medium has a very low reflectivity of about 20% and requires a high-power light source for the practical use. Also, the recording medium cannot be compatible with a conventional CD.

According to U.S. Pat. No. 5,328,813, a metal thin film as a recording layer is formed on a substrate, and a hard metal oxide layer is formed on the metal thin film to increase an information storing property and the reflectivity to 40~69%. However, the CNR is still low.

Also, U.S. Pat. No. 5,155,723 discloses a recording medium having a structure in which an organic dye layer as a recording layer is stacked on a substrate, and a reflecting layer and a protecting layer are stacked on the recording layer. According to the recording medium, the dye layer absorbs a recording laser beam for a recording to emit heat. Also, the substrate is heated and deformed by the heating, so that a recorded signal can be reproduced based on the difference of the reflectivity according to the recording. Here, the reflectivity of the recording medium is 70% or more and the CNR after recording is 47 dB or more to be compatible with the CD. However, the recording layer of the recording medium has low resistance against heat and light, and the manufacturing costs are high due to the use of expensive organic dye. Also, a spin coating is performed during the manufacturing process with an organic dye dispersion. However, the thickness of the coating layer must be accurately controlled with a deviation of ±3% or less during the manufacturing of an optical disc since the reflectivity is dependent on the thickness of the coating layer. Also, costly equipment is required and productivity is low.

SUMMARY OF THE INVENTION

It is an object of the present invention to provide an optical recording medium having 65% or more reflectivity at 780 nm to be compatible with compact discs (CD's), 40% or more reflectivity at 630~660 nm, and 47 dB or more carrier-to-noise ratio (CNR) to be replayable by a digital versatile disc player (DVDP).

To achieve this and other objects, there is provided an optical recording medium comprising: a substrate having pregrooves; and a metal recording layer, a buffering layer and a reflecting layer which are sequentially stacked on the substrate, wherein the buffering layer is formed of an organic material having a low light absorption with respect to a laser beam of 600~800 nm, such that light absorption (coefficient k of the imaginary part of the complex refractive index (n-ki)) is less than or equal to 1.0 at 650 nm and the light absorption is less than or equal to 0.1 at 780 nm.

Preferably, the refractive index (coefficient n of the real part of a complex refractive index) of the organic material of the buffering layer is greater than or equal to 1.7, the thermal decomposition temperature of the organic material of the buffering layer is 100~300° C., and the difference between a thermal decomposition temperature and a melting temperature is less than or equal to 80° C.

Hereinafter, the optical recording medium according to the present invention will now be described with reference to the appended drawings.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
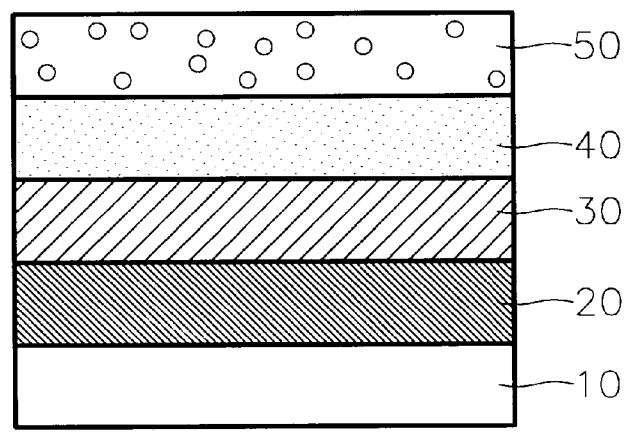
FIG. 1 is a sectional view showing the structure of an optical disc according to a preferred embodiment of the present invention.

Referring to FIG. 1 showing the structure of an optical recording medium according to a preferred embodiment of the present invention, the optical recording medium includes a substrate 10, and a metal recording layer 20, a buffering layer 30, a reflecting layer 40 and a protecting layer 50 which are sequentially stacked on the substrate 10.

In the optical recording medium having the above structure, the metal recording layer 20 is heated by a laser beam during an optical recording, and the heat is transferred to the substrate 10 and the buffering layer 30. A region of the substrate 10, adjacent to the heated region of the metal recording layer 20, is expanded and deformed, and the heated region of the metal recording layer 20 is swelled out toward the buffering layer 30 by the expanding force of the substrate 10.

Figure 2:
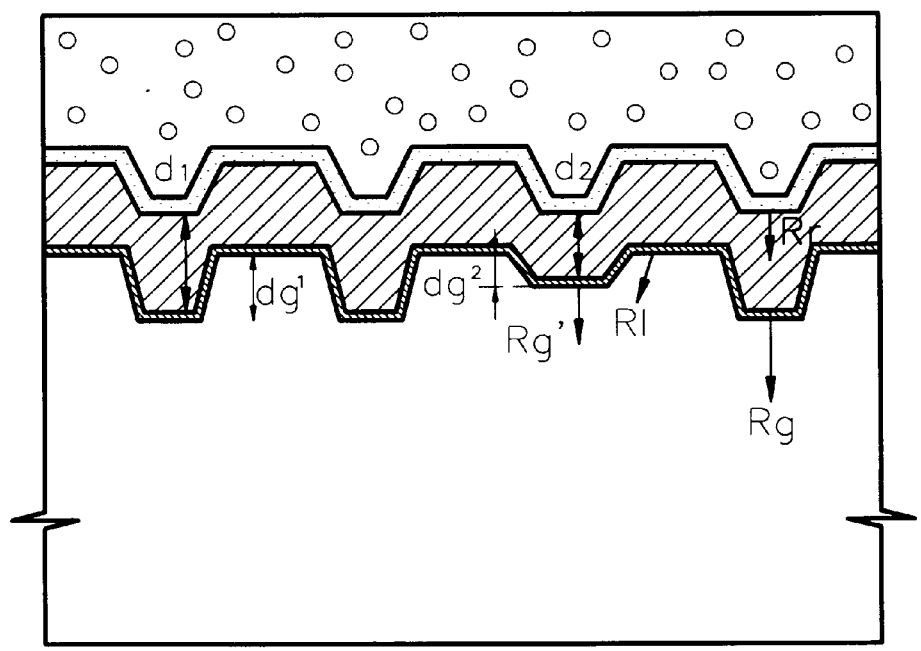
FIG. 2 is a sectional view showing a recorded portion and a non-recorded portion formed in the optical disc of FIG. 1.

FIG. 2 is a sectional view showing a recorded portion and a non-recorded portion in detail, which are formed in the optical recording medium according to the present invention. As shown in FIG. 2, in the recorded portion, the metal recording layer 20 generates heat by absorbing a laser beam, the substrate 10 is swelled up and the buffering layer 30 is deformed by heat, so that the reflecting layer 40 may be also deformed. Here, the degree of deformation is proportional to the heat generated from the metal recording layer 20 and dependent on the components and thickness of the metal recording layer 20 and the buffering layer 30.

In the optical recording medium of the present invention, the reflectivity of the recorded portion is lower than that of the non-recorded portion, causing reflectivity difference between the recorded portion and the non-recorded portion, wherein the reflectivity difference makes possible the recording and playback. Here, the reflectivity of the recorded portion is lowered than that of the non-recorded portion by the following principles.

Figure 3:
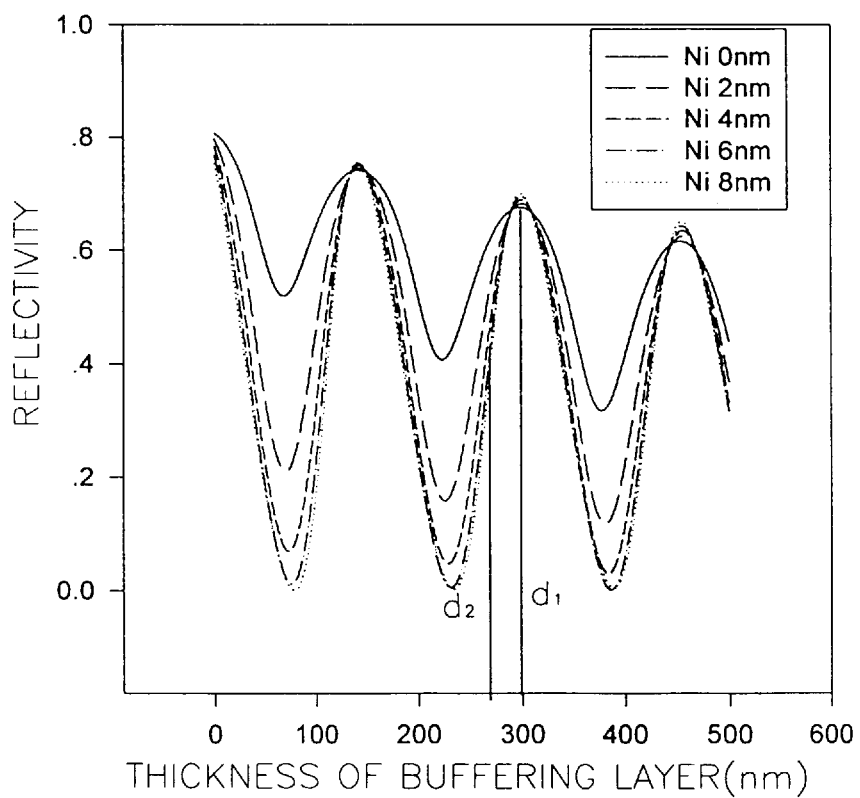
FIG. 3 is a graph showing the change of reflectivity according to the thickness of a buffering layer of the optical disc of FIG. 1.

First, the lower reflectivity in the recorded portion is due to a Fabry-Perot effect by the change in thickness of the buffering layer 30. That is, if the substrate 10 is swelled out by a recording laser, the thickness of the buffering layer 30 becomes thin (to $d_2$) after recording compared to the thickness (from $d_1$) before recording. Here, the reflectivity is varied according to the thickness of the buffering layer 30 as shown in FIG. 3, so that the reflectivity of the recorded portion decreases. Also, the decreased reflectivity depends on the thickness of the metal layer 20.

Second, the initial buffer layer thickness d1 optimized for the complex refractive index n-ki of the buffering layer 30 to have the maximum reflectivity. If a portion of the thin metal film 20 is heated by absorbing the irradiated recording light, the temperature of the portion sharply increases. As a result, the material of the buffering layer is damaged by the heat and the optical characteristics thereof are changed to n'-k'i, causing difference of optical paths between the non-recorded portion and the recorded portion. Thus, the reflectivity of the recorded portion decreases.

Third, the reflectivity of the recorded portion is decreased by destructive interference between a reflective light Rg reflected from pregrooves 60 of substrate and a reflective light R1 reflected from land sides 70. Referring to FIG. 2, the initial pregroove depth $dg^1$ is enough to cause constructive interference between the reflective light Rg and the reflective light R1. However, after recording using a recording laser, the substrate 10 and the metal recording layer 20 are expanded the direction of and into the buffering layer 30, so that the pregroove depth of substrate is decreased to $dg^2$. As a result, the depth of the pregroove 60' is decreased, thereby causing the destructive interference between the reflective lights Rg and R1. The destructive interference occurs in the recorded portion after the irradiation of light to decrease the reflectivity while the constructive interference occurs in the non-recorded portion.

In order to obtain a high CNR using the above phenomenon, the thickness and material of the buffering layer 30 must be appropriately optimized. That is, the heat generating phenomenon by absorbing the laser beam, as a source of forming a recording pit (deformation of the substrate), is mainly responsible due to the metal recording layer 20. Thus, the buffering layer 30 is formed of a material having low absorption at an usable wavelength to decrease the heat generation by the buffering layer 30. As a result, the buffering layer 30 can be easily deformed, and a high reflectivity can be achieved.

To the ends, the material for the buffering layer 30 should have coefficient n of the real part of the complex refractive index that is greater than or equal to 1.7 to increase the reflectivity difference before and after the recording (Here, the refractive index means a complex refractive index expressed by "n-ki", wherein n is a coefficient of the real part and k is a coefficient of the imaginary part, and k=0 at a wavelength without absorption). Also, preferably, the thermal decomposition temperature of the material for the buffering layer 30 is 100~300° C., and the difference between the thermal decomposition temperature and a melting temperature is less than or equal to 80° C. With aspect to the absorption aspect, preferably, the material for the buffering layer 30 should have a low absorption (k) at 600~800 nm wavelength of a laser beam, such that light absorption (k) at 650 nm is less than or equal to 1.0, and the light absorption (k) at 780 nm less than or equal to 0.1. If the difference of the thermal decomposition temperature and the melting temperature exceeds 80° C., the buffering layer 30 is easily melted resulting in damage to the land side 70 of the recorded portion, thereby deteriorating the characteristics of optical signal.

Hereinafter, each constituent of the optical recording medium according to the present invention will be described in detail.

In the present invention, the substrate 10 is formed of a material which is transparent to a laser beam and capable of being easily expanded and deformed at 80~200° C., and has excellent impact intensity. As a material for satisfying the above conditions, polycarbonate, polymethylmethacrylate (PMMA), epoxy resin, polyester or amorphous polyolefin is used. Preferably, a material having glass transition temperature of 100~200° C. is used. Also, pregrooves 60 for guiding an incident laser beam during the recording or playback are formed, wherein the depth of the pregrooves 60 is preferably 50~300 nm. If the depth of the pregrooves 60 is less than 50 nm, after recording the reflectivity greatly increases by the expansion of the substrate 10, so that much noise is included in a recorded signal. On the contrary, if the depth of the pregrooves 60 exceeds 300 nm, the groove image of the buffering layer 30 is too deep, thereby decreasing the reflectivity. Also, it is difficult to obtain a buffering layer 30 having an even surface by a spin coating.

The metal recording layer 20 acts as a heat generating layer by absorbing a laser beam and a partial mirror for providing a contrast difference before and after recording. In the optical characteristic of the metal of the recording layer 20, preferably, the metal has 0.01 or more of the coefficient k of the imaginary part of a complex refractive index. If the coefficient k is less than 0.01, the light absorption is low during the recording, so that the recorded portion is less deformed, thereby lowering a recording sensitivity.

Also, preferably, the metal recording layer 20 have 30~300 Å thickness, 5~95% transmittance and 5~95% reflectivity. If the thickness is 30 Å or less, amount of heat generated by the light absorption for the recording is not sufficient to deform the substrate. On the contrary, if the thickness thereof exceeds 300 Å, the expansion of the substrate for the recording is hindered by the metal recording layer 20, so that the recorded portion is less deformed. Also, with the increase of the metal layer, thermal conductivity of the metal is increased to damage the land side, which results in deterioration of signal. Also, scattering of the light is increased, so that it is difficult to obtain a high reflectivity.

Preferably, the thermal conductivity of the metal recording layer 20 is 4W/cm·°C. or less. If the thermal conductivity of the metal recording layer exceeds 4W/cm·°C., it is difficult for the recording layer 20 itself to be heated to a predetermined temperature since the heat of the recording layer, generated by absorbing a laser beam is rapidly diffused to the surrounding material. Even though the recording layer 20, is heated to the intended temperature, adjacent tracks may be deformed since the size of the recording pit is increased.

Also, it is preferable that the thermal linear expansion coefficient of the metal recording layer is equal to or greater than $3 \times 10^{-6}/°C$. If the linear expansion coefficient is less than the level, the metal recording layer 20 is cracked by the expansion of the substrate during the recording, so that a good recorded signal value cannot be obtained.

To satisfy the above conditions, it is preferable that the metal recording layer 20 is formed of gold (Au), aluminum (Al), chromium (Cr), titanium (Ti), copper (Cu), nickel (Ni), platinum (Pt), silver (Ag), tantalum (Ta), iron (Fe) or alloys thereof using a vacuum deposition, electron beam (E-beam) or sputtering method.

According to the present invention, the buffering layer 30 has a thickness of 50~1,000 nm, and is deformed by the deformation of the substrate 10 and the metal recording layer 20. Accordingly, the shape of an interface between the deformed buffering layer 30 and reflecting layer 20 is changed, thereby maximizing the reflectivity change by the recording. Thus, generally, the buffering layer 30 is formed of a material capable of being easily deformed by the heat transferred from the metal recording layer 20 and its own direct absorption of light energy. However, in the present invention, a material having a low light absorption at the above-described available wavelength of 600~800 nm is used to minimize the direct absorption of the light energy by the buffering layer 30 for high reflectivity. In detail, as a material of the buffering layer 30, an organic material satisfying the following characteristics is used: that is, a material having solubility of 0.5 g/10 ml or more in solvents without damage to the substrate, thermal decomposition temperature of 100~300° C. for excellent recording sensitivity, difference of 80° C. or less between the decomposition and melting temperature for good deformation of the buffering layer, complex refractive index (coefficient n of the real part of the complex refractive index) which is greater than or equal to 1.7 at the initial state for increasing a contrast of a recorded signal, and a low light absorption at 600~800 nm for a high reflectivity at the same wavelength.

The buffering layer 30 is formed of an organic material satisfying the above conditions, such as aromatic compound, aliphatic compound, amide compound, ester compound, urea, amine, sulfur compound, hydroxy compound or mixtures thereof. In particular, the buffering layer is preferably formed of at least one dye selected from the group consisting of anthraquinone, dioxadine, triphenodithiazine, phenanthrene, cyanine, phthalocyanine, naphthalocyanine, merocyanine, pyrylium, xanthine, triphenylmethane, croconium, azo, indigoid, methine, azulene, squarium, sulfide and metal dithiolate.

The organic material may be mixed with a polymer resin to improve the property related to the spin-coating. Here, preferably, the polymer resin content is 50 wt % or less based on the weight of the organic material. The polymer resin may includes vinylalcohol resin, vinylacetate resin, acrylate resin, polyester resin, polyether resin, polystyrene resin, polyurethane resin, cellulose resin and fatty acid resin.

In the present invention, the buffering layer 30 is formed by a general method using the above-described material. For example, the above-described material of the buffering layer 30 is dissolved in an organic solvent, and then the obtained solution is spin-coated on the metal recording layer 20. Here, there is no limitation in the organic solvent if an organic solvent is capable of easily dissolving the material of the buffering layer without damage to the substrate.

The reflecting layer 40 is formed of a general method. For example, the reflecting layer 40 is formed of gold (Au), aluminum (Al), copper (Cu), chromium (Cr), nickel (Ni), platinum (Pt), silver (Ag), tantalum (Ta), titanium (Ti), iron (Fe) or alloys thereof to a thickness of 500~2,500 Å by an E-beam or sputtering method.

The protecting layer 50 protects other constituent layers of the optical recording medium. The protecting layer 50 is formed by a general method. For example, the protecting layer 50 is formed by spin-coating on the reflecting layer 40 an epoxyacrylate resin which is transparent and curable by ultraviolet rays, and has a great impact intensity, and then curing the spin-coated product by irradiating ultraviolet rays.

Hereinafter, the present invention will be described in detail with reference to the following examples. However, the present invention is not limited to the following examples.

EXAMPLE 1

A nickel (Ni) recording layer 20 was vacuum-deposited to 4 nm thickness on a polycarbonate (PC) substrate 10 with 1.2 mm thickness having pregrooves with 190 nm depth, 0.8 $\mu$m width at the uppermost portion thereof, 0.22 $\mu$m width at the bottom thereof and 1.6 $\mu$m track pitch. Then, a coating solution obtained by dissolving 0.85 g red dye (CVS-300, ICI, U.K., absorption (k) of 0 at 780 nm, absorption (k) of 0.43 at 650 nm) having thermal decomposition temperature of 200° C. and melting temperature of 240° C. in 10 ml diacetone alcohol (DAA) was spin-coated on the Ni recording layer at 4,000 rpm to form a buffering layer 30. Here, the thickness of the buffering layer 30 corresponding to the pregroove portion, measured by a scanning electron microscope (SEM), was about 280 nm. After drying the resultant structure at 40° C. in a vacuum oven, Au was vacuum-deposited to about 1,000 Å to form a reflecting layer 40. Then, an ultraviolet (UV)-curable epoxyacrylate resin was spin-coated on the reflecting layer and then cured to form a protecting layer 50, resulting in a disc.

Figure 4:
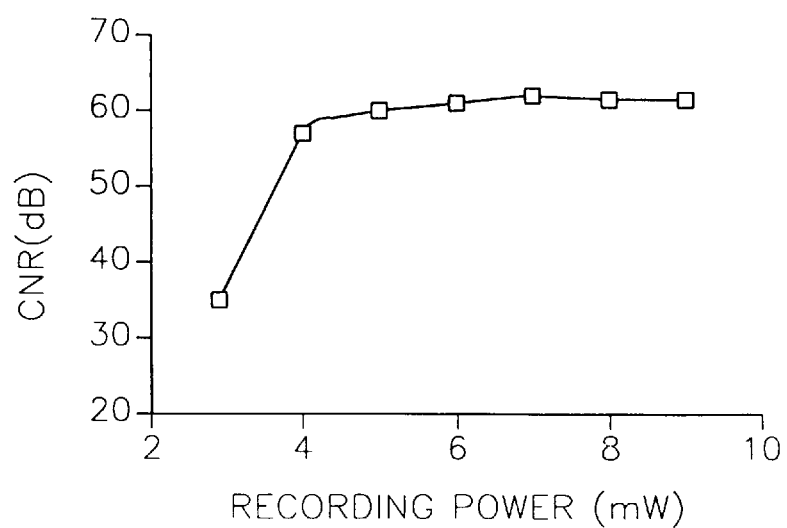
FIG. 4 is a graph showing the change of CNR according to recording power in the optical disc of FIG. 1.

According to the result of the evaluation on the obtained disc, using a CD-R tester (OHMT-500, Apex) adopting 780 nm laser beam, reflectivity before the recording was 80%, and the maximum reflectivity $R_{top}$ was 67% and the CNR was 65 dB using 0.7 mW recording laser power with respect to a disc which was recorded at 1.3 m/sec recording speed using 8 mW, 720 kHz recording power. Under the above recording conditions, a recorded signal of 47 dB or more CNR was reproduced at 4 mW or more recording power as shown in FIG. 4. Also, after recording an audio signal in the disc using a CD-R recorder (RPD-1000, Pioneers), the recorded audio signal could be reproduced using a CD player (Mark II, Philips). According to the recording characteristics of the disc, evaluated by a CD-CATS (Audio Development Co., Sweden), the evaluated all items satisfied the standard for CD's. Also, the reflectivity of the disc was 51% at the wavelength of 650 nm, and information recorded in the disc could be reproduced by a digital versatile disc player (DVDP).

EXAMPLE 2

A disc was manufactured by the same method as that of Example 1, except that the material of the metal recording layer 20 was replaced by CuAl with 6 nm thickness, and the performance of the disc was evaluated.

The reflectivity before the recording was 76%, and the maximum reflectivity $R_{top}$ was 62% and the CNR was 57 dB. Also, the reflectivity at 650 nm was 51%. Also, after recording an audio signal in the disc, the recorded audio signal could be reproduced using a CDP and a DVDP.

EXAMPLE 3

A disc was manufactured by the same method as that of Example 1, except that the material of the metal recording layer 20 was replaced by Ta with 5 nm thickness, and the performance of the disc was evaluated.

According to the result of the performance evaluation, the reflectivity before the recording was 76%, and the maximum reflectivity $R_{top}$ was 65% and the CNR was 62 dB, and the reflectivity at 650 nm was 53%. After recording an audio signal in the disc using a CD-R recorder, the recorded audio signal could be reproduced using a CDP and a DVDP.

EXAMPLE 4

A disc was manufactured by the same method as that of Example 1, except that the material of the reflecting layer 40 was replaced by Al with 100 nm thickness, and the performance of the disc was evaluated.

According to the result of the performance evaluation, the reflectivity before the recording was 77%, and the maximum reflectivity $R_{top}$ was 65% and the CNR was 62 dB, and the reflectivity at 650 nm was 51%. After recording an audio signal in the disc using a CD-R recorder, the recorded audio signal could be reproduced using a CDP and a DVDP.

EXAMPLE 5

A disc was manufactured by the same method as that of Example 1, except that a solution obtained by dissolving 0.95 g NK-1532 (Japanese photosensitive dye) and 0.05 g L-04 (Japanese photosensitive dye) in 10 ml diacetone alcohol (DAA) was used to form a buffering layer 30. In the solution for the buffering layer 30, refractive index n and absorption (k) at 780 nm were 1.85 and 0.024, respectively, and those at 650 nm were 2.05 and 0.03, respectively. After recording a music, the recorded music could be reproduced by a CDP and a DVDP. The maximum reflectivity $R_{top}$ at 780 nm was 66%, and the reflectivity at 650 nm was 43%.

Comparative Example 1

A disc was manufactured by the same method as that of Example 1, except that the material of a buffering layer 30 was replaced by 0.85 g cyanine dye S-04 (Nippon Kanko Shikiso Kenkusho Co., Ltd.) having refractive index n of 2.5 and absorption (k) of 0 at 780 nm, and refractive index n of 1.49 and absorption (k) of 1.41 at 650 nm, and the performance of the disc was evaluated. Here, the thickness of the buffering layer 30 corresponding to the pregroove portion, measured by a scanning electron microscope (SEM), was about 300 nm.

According to the result of the performance evaluation, the reflectivity before the recording was 78%, and the maximum reflectivity $R_{top}$ was 66% and the CNR was 65 dB. Also, after recording an audio signal in the disc using a CD-R recorder (RPD-1000, Pioneers), the recorded audio signal could be reproduced using a CD player (Mark II, Philips). According to the recording characteristics of the disc, evaluated by a CD-CATS, the evaluated all items satisfied the standard of the CD. However, the reflectivity at 650 nm was 20%, so that the reproduction by a DVDP was impossible.

Comparative Example 2

A disc was manufactured by the same method as that of Example 1, except that the material of a buffering layer was replaced by 0.80 g T-0.43 dye (Nippon Kayaku Co., Ltd.) having thermal decomposition temperature of 215° C. and melting temperature of 125° C., and the performance of the disc was evaluated.

According to the result of the performance evaluation, the reflectivity before the recording was 79%, and the maximum reflectivity $R_{top}$ was 65% and the CNR was 45 dB. Also, after recording an audio signal in the disc using a CD-R recorder (RPD-1000, Pioneers), the recorded audio signal could not be reproduced using a CD player (Mark II, Philips). According to the result evaluated by the evaluation equipment used in Example 1, land sides 70 were seriously deformed.

Comparative Example 3

A dye solution obtained by dissolving 4.4 g N,N'-2,5-cyclohexadien-1,4-diylidenbis[4-(dibutylamino)-N-[4-(dibutylamino)phenyl]-bis[(OC-6-11)-hexafluoro-antimonate(10)] (NK-3219, Nippon Kanko Shinko Kenkusho CO., Ltd., $\lambda_{max}$=720 nm, refractive index n of 2.28 at 780 nm, absorption (k) of 0.024 at 780 nm, refractive index n of 1.18 at 650, and absorption (k) of 1.31 at 650 nm) in 100 ml DAA was deposited on a polycarbonate (PC) substrate with 1.2 mm thickness having pregrooves with 153 nm depth, 0.8 μm width at the uppermost portion thereof, 0.25 μm width at the bottom thereof and 1.6 μm track pitch, by a spin coater at 50 rpm for 5 seconds, at 1,500 rpm for 15 seconds, at 4,000 rpm for 30 seconds in sequence, and then fully dried. Then, an Au reflecting layer was formed to 100 nm thickness using a sputter. After depositing a UV-curable resin on the Au reflective layer, the resultant structure was cured by irradiating UV to form a protecting layer with 10 μm thickness, thereby resulting in a disc. The maximum reflectivity $R_{top}$ was 66%, and the CNR was 65 dB using 0.7 mW laser with respect to a disc which was recorded at 1.3 m/sec recording speed using 8 mW, 720 kHz recording power. Also, the reproduction by a DVDP was impossible.

As described above, the optical recording medium of the present invention can be compatible with a CD by appropriately selecting the material for the buffering layer 30, has a high reflectivity at a wavelength of 600 nm or higher, thereby providing a desirable CNR characteristic. The present invention has been described by way of exemplary embodiments to which it is not limited. Variations and modifications to the exemplary embodiments will occur to those skilled in the art which do not depart from the scope and spirit of the present invention as identified in the claims attached hereto.

What is claimed is:

1. An optical recording medium comprising:
a substrate having pregrooves;
a metal recording layer;
a buffering layer; and
a reflecting layer which are sequentially stacked on the substrate,
wherein the buffering layer is formed of an organic material having a low light absorption with respect to a laser beam of 600~800 nm, such that the light absorption (k) is less than or equal to 1.0 at 650 nm and the light absorption (k) is less that or equal to 0.1 at 780 nm.

2. The optical recording medium of claim 1, wherein a thermal decomposition temperature of the organic material of the buffering layer is 100~300° C.

3. The optical recording medium of claim 2, wherein a difference between the thermal decomposition temperature and a melting temperature of the organic material is less than or equal to 80° C.

4. The optical recording medium of claim 1, wherein a refractive index coefficient n of the real part of a complex refractive index of the organic material of the buffering layer is greater than or equal to 1.7.

5. The optical recording medium of claim 1, wherein the organic material comprises at least one material selected from the group consisting of aromatic compound, aliphatic compound, amide compound, ester compound, urea, amine, sulfur compound, hydroxy compound or mixtures thereof.

6. The optical recording medium of claim 5, wherein the organic material includes at least a dye selected from the group consisting of anthraquinone, dioxadine, triphenodithiazine, phenanthrene, cyanine, phthalocyanine, naphthalocyanine, merocyanine, pyrylium, xanthine, triphenylmethane, croconium, azo, indigoid, methine, azulene, squarium, sulfide and metal dithiolate.

7. The optical recording medium of claim 1, wherein the buffering layer includes 50 wt % or less of polymer based on the weight of the organic material.

8. The optical recording medium of claim 7, wherein the polymer comprises at least one selected from the group consisting of vinylalcohol resin, vinylacetate resin, acrylate resin, polyester resin, polyether resin, polystyrene resin, polyurethane resin, cellulose resin and fatty acid resin.

9. The optical recording medium of claim 1, wherein the thickness of the buffering layer is 50~1,000 nm.

10. The optical recording medium of claim 1, further comprising a protecting layer formed on the reflecting layer.

11. The optical recording medium of claim 1, wherein the reflectivity of the optical recording medium is 40% or more at 600~800 nm.

12. The optical recording medium of claim 1, wherein the depth of the pregroove formed in the substrate is 50~300 nm.

13. The optical recording medium of claim 1, wherein at least one of the substrate and the metal recording layer, and the buffering layer has a deformed portion.

14. The optical recording medium of claim 13, wherein the substrate and the metal recording layer have the deformed portion, and a portion of the buffering layer corresponding to the deformed portion has a reduced thickness.

15. The optical recording medium of claim 13, wherein the substrate and the metal recording layer, and the buffering layer have the deformed portions corresponding to each other.

16. The optical recording medium of claim 15, wherein the reflecting layer has a deformed portion corresponding to the deformed portion of the buffering layer.

17. The optical recording medium of claim 1, wherein the thickness of the metal recording layer is 30~300 Å.

18. The optical recording medium of claim 1, wherein the metal recording layer comprises a metal having a coefficient k of the imaginary part of a complex refractive index, which is greater than or equal to 0.01.

19. The optical recording medium of claim 18, wherein the metal recording layer comprises a metal selected from the group consisting of gold (Au), aluminum (Al), chromium (Cr), titanium (Ti), copper (Cu), nickel (Ni), platinum (Pt), silver (Ag), tantalum (Ta), iron (Fe) and alloys thereof.

20. An optical recording medium comprising:
a substrate having pregrooves;
a metal recording layer;
a buffering layer; and
a reflecting layer which are sequentially stacked on the substrate,
wherein the buffering layer is formed of an organic material having a low light absorption with respect to a laser beam of 600~800 nm, such that the light absorption coefficient k of the imaginary part of the complex refractive index (n-ki) is less than or equal to 1.0 at 650 nm and the light absorption (k) is less than or equal to 0.1 at 780 nm, and wherein a difference between a thermal decomposition temperature and a melting temperature of the organic material is less than or equal to 80° C.

21. A method of forming an optical recording medium comprising the steps of:
forming pregrooves in a substrate;
forming a metal recording layer on said pregrooves;
forming a buffering layer on said metal recording layers;
forming a reflecting layer on said buffering layer,
wherein the buffering layer is an organic material selected to have a low light absorption with respect to a layer beam of 600~800 nm, such that the light absorption coefficient k of the imaginary part of the complex refractive index (n-ki) is less than or equal to 1.0 at 650 nm and the light absorption k is less than or equal to 0.1 at 780 nm.

* * * * *